United States Patent
Chan et al.

(10) Patent No.: US 8,055,788 B1
(45) Date of Patent: Nov. 8, 2011

(54) EFFICIENT PERSON SEARCH MECHANISM IN PEER-TO-PEER NETWORKS

(75) Inventors: Gary Shueng Han Chan, Hong Kong (CN); Vanessa Meng I Lei, Macau (CN); Patrick Chun Sing Fan, Hong Kong (CN); Marvin Yuk Kit Kwok, Hong Kong (CN); Reeve Kit Wah Lau, Hong Kong (CN); Ivan Ka Wai Lee, Hong Kong (CN)

(73) Assignee: Hong Kong University of Science and Technology, Kowloon (HK)

( * ) Notice: Subject to any disclaimer, the term of this patent is extended or adjusted under 35 U.S.C. 154(b) by 491 days.

(21) Appl. No.: 11/562,103

(22) Filed: Nov. 21, 2006

Related U.S. Application Data

(60) Provisional application No. 60/738,063, filed on Nov. 21, 2005.

(51) Int. Cl.
*G06F 15/173* (2006.01)
(52) U.S. Cl. ........ 709/238; 709/239; 709/240; 709/242; 709/243; 709/244
(58) Field of Classification Search .......... 709/238–240, 709/242–244
See application file for complete search history.

(56) References Cited

U.S. PATENT DOCUMENTS

| | | | |
|---|---|---|---|
| 2004/0003041 A1* | 1/2004 | Moore et al. | 709/204 |
| 2004/0098503 A1* | 5/2004 | Zhang et al. | 709/238 |
| 2004/0249970 A1* | 12/2004 | Castro et al. | 709/238 |
| 2005/0220134 A1* | 10/2005 | Lin | 370/437 |
| 2005/0223102 A1* | 10/2005 | Zhang et al. | 709/228 |
| 2006/0190715 A1* | 8/2006 | Miller | 713/150 |
| 2007/0280464 A1* | 12/2007 | Hughes et al. | 379/205.01 |
| 2008/0115125 A1* | 5/2008 | Stafford et al. | 718/1 |
| 2008/0130516 A1* | 6/2008 | You et al. | 370/254 |

OTHER PUBLICATIONS

A. Rowstron and P. Druschel, "Pastry: Scalable, decentralized object location and routing for large-scale peer-to-peer systems". IFIP/ACM International Conference on Distributed Systems Platforms (Middleware), Heidelberg, Germany, pp. 329-350, Nov. 2001.*

* cited by examiner

*Primary Examiner* — Wing Chan
*Assistant Examiner* — Hitesh Patel
(74) *Attorney, Agent, or Firm* — Schwabe, Williamson & Wyatt, P.C.

(57) ABSTRACT

An efficient person search method utilizing human communications characteristics such as close social network, user-dependent hot list, and high skewness in access popularity. This method makes use of hot lists in the routing process and clusters people of the same community together in the search graph, thereof creating a "small-world" effect to minimize the hop counts routing would have to go through in a Peer-to-Peer environment.

20 Claims, 14 Drawing Sheets

(a) Alice's routing table after filling with buddies.

Fig. 4

(b) Alice's final routing table.

Fig. 5

EFFICIENT PERSON SEARCH MECHANISM IN PEER-TO-PEER NETWORKS

CROSS-REFERENCE TO RELATED APPLICATIONS

This application claims priority from U.S. provisional patent application 60/738,063 filed on Nov., 21, 2005, which is hereby incorporated by reference.

BACKGROUND AND SUMMARY OF THE INVENTION

The present application relates to locating a unique or specific item in a Peer-to-Peer (P2P) network, and more particularly to locating a person in the P2P network.

Many exciting applications, such as Voice over IP (VoIP) and Instant Messaging (IM), would benefit from the support of efficient person search. Nowadays, the search mechanisms for these applications still operate in a rather centralized manner. Users are required to register with a central server when they log into the system and query it for the addresses of their target search people. This is not scalable and the server introduces a single point of failure.

In person-searching applications (as in VoIP and IM), a person usually has a hot list which contains the people he/she often calls, such as colleagues, family members and friends. It has long been observed that human communication, and hence the hot list, exhibits the following characteristics:

Strong access skewness: Hot list is often short (of size around not more than ten), which means that contacts often skewed towards only a few people. Some people also are popular and have a relatively dense social connection. They are not only often called, but also good candidates to be contacted when searching for an unknown person.

User-dependent: The calls and hot lists are very user-dependent or user-specific, where a person popular in one domain may not be so in another.

Dense social network: Social network has high locality and is closely knit together. This is the so-called "small world" effect in which the person called is likely known by caller's direct or non-distant friends. Furthermore, users in the same domain (say within the same company or institute) or community (say alumni of a university) often communicate with each other.

It is clear that in order to locate a person efficiently, the search mechanism should take advantage of the above communication patterns. Hence the person searching differs from the traditional file searching in two major ways:

Item uniqueness: While multiple copies of files or resources exist in a file sharing system, the target item being located here is unique. Consequently, schemes taking advantage of the popularity of items (such as random walk and flooding) would not be efficient.

Access pattern: Contrasting with file searching where the file popularity is generally assumed to be the same for all users, the access pattern in person searching is very user-dependent and domain-specific. This fundamentally changes the underlying system assumption. If one naively applies file-search mechanisms to person-searching, the search therefore would not be effective.

Generally, P2P overlay networks can be categorized into unstructured and structured. In an unstructured overlay (such as Gnutella), peers are organized in a random graph and flooding or random walks is used to locate items. Clearly, it is very resource consuming to search for rare items on a large network. A negative answer to a search may mean that either the item does not exist or it is not found within a certain search scope. A structured overlay such as Pastry overcomes the search inefficiency for rare items. It assigns keys to items using a hash table and organizes the participating peers into a graph based on their IDs (the so-called nodeID). The graph is structured to facilitate the search for an item based on its key, by routing the message to a responsible peer who has nodeID numerically closest to the key.

RELATED WORKS

There has been much work on how to improve the lookup latency of structured P2P networks, such as Pastry and Chord. These techniques can be generally categorized into topology-aware and interest-based.

Pastry is a topology-aware approach. To reduce search time, the routing table of a joining peer is initialized by using the routing tables of nearby peers in the nodeID space. The intention is to have the entries of the routing table pointing to some peers of close location in the search graph. Lookup-parasitic random sampling (LPRS), a variation of Pastry, initializes the routing table without considering entry locality. It discovers nodes in close location by random sampling during the lookup process. The proposed approach in this embodiment extends the idea by making use of the hot list to fill the routing table with nodes of high access frequency. Consequently, search in this sample embodiment is more efficient because most of the searches can be completed in one hop. Other topology-aware approaches include expressway. In expressway, resource heterogeneity of hosts is considered. The network is partitioned into regions, with the most resourceful peers of a region promoted as express-way neighbors and short-cuts made to them. Each express-way neighbor is a representative serving all other peers in that region. The proposed scheme in this embodiment clusters peers and provides short-cuts to the clusters. Since the proposed scheme does not have any fixed cluster representative, hence representative overloading is avoided. Further in order to reduce search time, proposed scheme group those likely to communicate with each other together.

Associative overlay's is an interest-based approach based on unstructured P2P overlay to locate rare items. A peer is connected to other peers which possess the same item. The intuition is that peers sharing the same item may share the same interest. It is hence more likely to locate the target item from the peers of the same interest, even the target may be a rare one. However, the more items a peer has, the more neighbors it needs to keep. Moreover, it shares the same weakness of unstructured overlay in that its answers to a query are non-deterministic. The proposed scheme in this embodiment runs on a structured P2P network and hence deterministic answers can be provided. Further with the size of routing table fixed in the proposed scheme, overhead of maintaining routing table is low.

Pastry Overview

Pastry is a scalable, decentralized and self-organizing P2P object location and routing substrate. It automatically adapts to node arrivals, departures and failures.

Each peer in Pastry is assigned randomly a 128-bit node identifier nodeID) when a node joins the system. The nodeID is used to indicate a node's position in a circular nodeID space (a logical ring), which ranges from 0 to $2^{128}-1$.

An item is defined as any resource a search mechanism attempts to locate in the network and is given a unique key, whose key space is the same as that of the nodeID. An item is handled by a "responsible" node, whose nodeID is numerically closest to the item key. All search queries for a resource should be sent to the responsible node.

Every Pasty node maintains a routing table and a leaf set for message routing. The routing table is organized into log $2^b$ N rows and $2^b-1$ columns, where N is the maximum number of nodes in the overlay and b is a parameter determining the size of the routing table (normally chosen to be 4). The entries in row n refer to nodes whose nodeIDs share exactly the first n prefix digits with the current node. Entries of the routing table are (nodeID, IP-address pair. It is a node with known. IP-address and whose nodeID corresponds to the shared prefix. The node is chosen to be near the current node according to some proximity metric, such as the number of hops in. IP routing or geographic distance. If no such node is known, the entry is left empty. The leaf set contains L numerically close nodes with the current node in the logical ring.

In Pastry, messages are routed according to the longest prefix-matching principle. If the target item key is found in the leaf set, then the message is routed directly to the destination node in the next hop (the destination node is with nodeID numerically closest to the key). If the key is not in the leaf set, the current node looks up its routing table a node whose nodeID shares the longest prefix with its own nodeID and routes the message to this node. If there is no such node, the message is routed to a node that shares the same prefix length with the present node but is numerically closer to the target item key.

Obviously, a structured overlay is more efficient to search for unique items. However, since all items are treated equally in structured overlays, Pastry cannot utilize social information such as popular people (as the ones in the hot list) to improve the search time.

INVENTION OVERVIEW

The present application provides a new architecture for person-to-person networks which is quite different from prior approaches, and which has greatly improved scaling characteristics. In various embodiments this is implemented with a completely decentralized approach, leading to a system scalable to large number of users.

The discussion above shows that person-searching has its own problems, which are somewhat intractable to conventional solutions. However, the present inventors have realized that person-searching also has some built-in properties which can be exploited to greatly improve P2P searching for person-searching applications.

One innovative point is that for users in a person-to-person network, the proposed scheme makes use of a user's hot list to form the routing table for the search phrase, leading to faster search time for the ones a user calls often. Furthermore, by intelligently assigning nodeIDs to peers, peers of the same domain can be close to each other in the overlay search graph. Due to access locality within a domain, the search goes to a domain first before the person is located. Simulation shows that the search time for the proposed domain is much faster than the traditional Pastry (by as much as 50%).

The advantages of the proposed approach are highlighted as follows:
Making: use of the hot list to fill the routing: table with nodes of high access frequency. Consequently, search is more efficient because most of the searches can be completed in one hop;
Clustering peers and provides short-cuts to the clusters. Since no fixed cluster representative is required, hence representative overloading is avoided. And further improvement is achieved by grouping those peers likely to communicate with each other together; and
Based on a structured P2P network and hence deterministic answers can be provided. Further with the size of routing table fixed in the proposed scheme, overhead of maintaining routing table is low.

BRIEF DESCRIPTION OF THE DRAWINGS

The disclosed inventions will be described with reference to the accompanying drawings, which show important sample embodiments of the invention and which are incorporated in the specification, hereof by reference, wherein:

FIG. 4 shows an example of Alice's routing table after filling it with her buddies in her hot list FIG. 5 shows an example of Alice's final routing table.

DETAILED DESCRIPTION OF THE PREFERRED EMBODIMENTS

The numerous innovative teachings of the present application will be described with particular reference to the presently preferred embodiment (by way of example, and not of limitation).

Pastry is adopted as the basis of the invention, with the goal of minimizing hop counts for a person search. The invention has two important aspects: nodeID assignment and routing table construction.

A. NodeID Assignment

Pastry assigns nodeID and item key generated independently, though they share the same key space. In the sample embodiment, a person is represented by a unique username in the form of somebody@somedomain; the person key is generated from the username by a hash table. A machine is represented by a nodeID. Since the assumption is that a person is accessed via a machine, the nodeID is regarded the same as the person key, and consequently a search for the person corresponds to a search for the nodeID.

Note that if two nodes are close to each other in the logical ring, the number of hops required to route a query is small.

Figure 1:
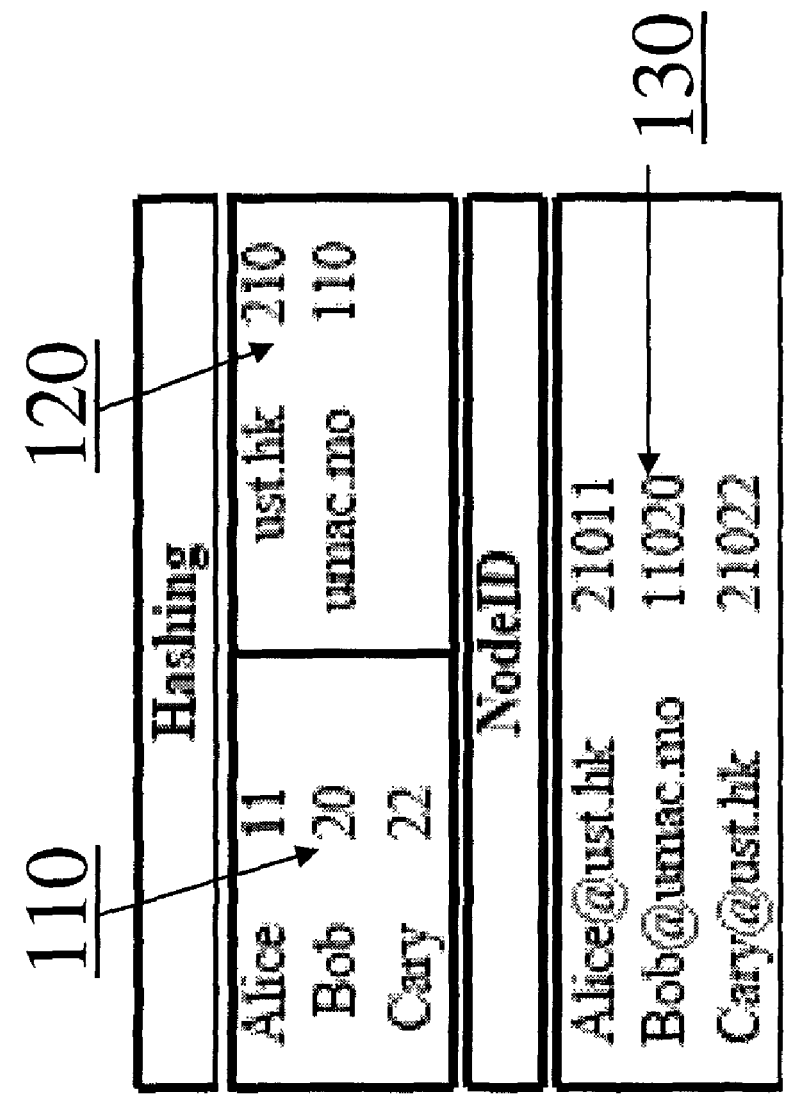
FIG. 1 shows an example of two step-hashing to derive NodeIDs.

Clearly, it is important to assign nodeID in such a way that people who are likely to look for each other share longer prefix of nodeID so that they are placed close in the logical ring. The challenge here is that a person's hot list is not known in advance. Even if it is known in advance, it is still infeasible to assign nodeID to a person based on its hot list. A reason is that hot list ma change over time, but a person's nodeID should represent his/her identity and should not be changed frequently. Given that people from the same domain are more likely to know, and hence call, each other, the proposed approach has a two-step hash function to generate the nodeID. An example is shown in FIG. 1. The username of the identifier is hashed to get a string of length m (which is 2 in the example 110) and the domain name of the identifier is hashed to get a string of length n (which is 3 in the example 120). These two strings are concatenated to form nodeID 130, with the domain name as the prefix. The assumption is that people of the same domain belong to an organization, company, or service provider, and are more likely to call each other due to locality.

B. Rowing Table

Figure 2:
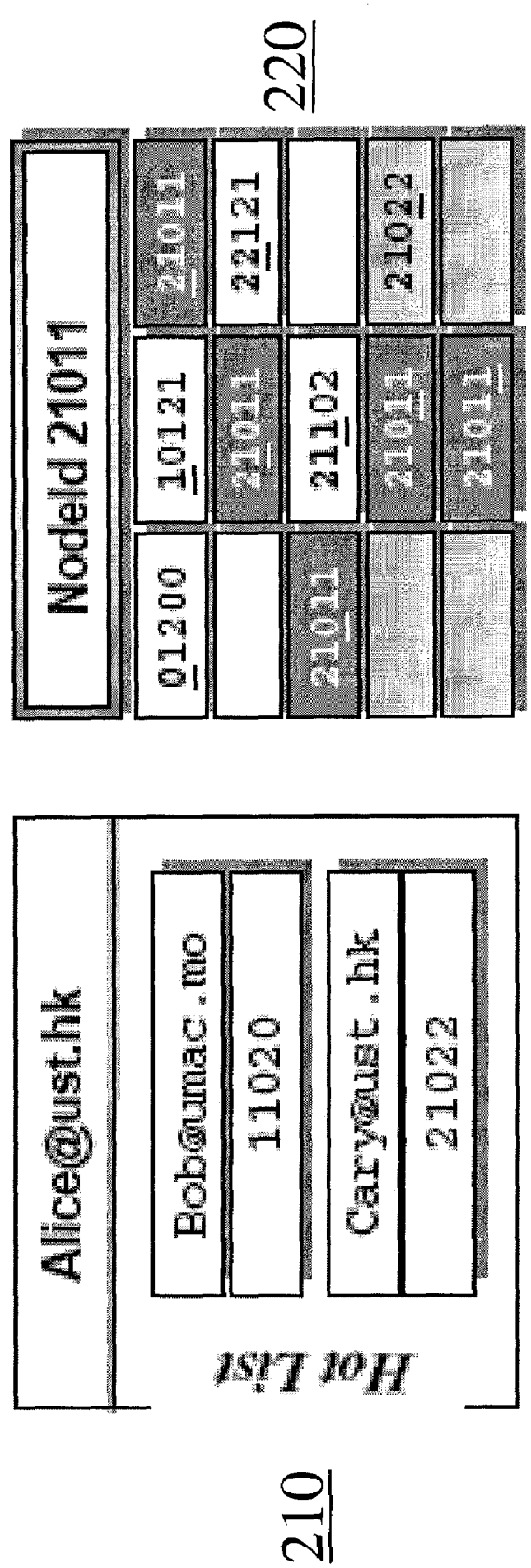
FIG. 2 shows an example hot list and initial routing table of a person Alice.

All nodes participate in message routing. When a new node joins the network, it starts populating its routing table. A new node X knows about another nearby node Y by contacting the bootstrap server. X then requests Y to route a JOIN message back to X. The message is then forwarded to the node Z whose nodeID is numerically closest to X. In response to receiving the JOIN message, nodes Y, Z, and all other nodes on the path send to X their routing tables, using which X initializes its own routing table. FIG. 2 shows the hot list 210 and the initial routing table 220 of an example person named Alice.

After that, table exchange takes place. The aim is to populate a node's routing table with entries of high access rate. In the sample embodiment, buddies in a person's hot list is defined as first-hop buddies, and first-hop buddies' buddies as second-hop buddies, etc. Such hop is called social hop which indicates a distance in a social network. Such a social network allows a person accesses his/her first-hop buddies with the highest access rate, and the second-hop buddies with lower access rate and so on. Furthermore, since the hot list of a person and his/her buddies may be correlated, routing a message to one's buddies may increase the success probability.

The following are the steps of table exchange to create a social network:

1) The new node first searches for all its buddies in its hot list and replaces entries of its routing table by its buddies. The entries are marked to indicate they are first-hop buddies.
2) The node randomly selects a buddy from its hot list, and acquires routing table from it.
3) The node looks for and replaces its routing table with entries of the acquired table with fewer social hops.
4) Repeat Steps 2 & 3 until the routing table stabilized.

Figure 3:
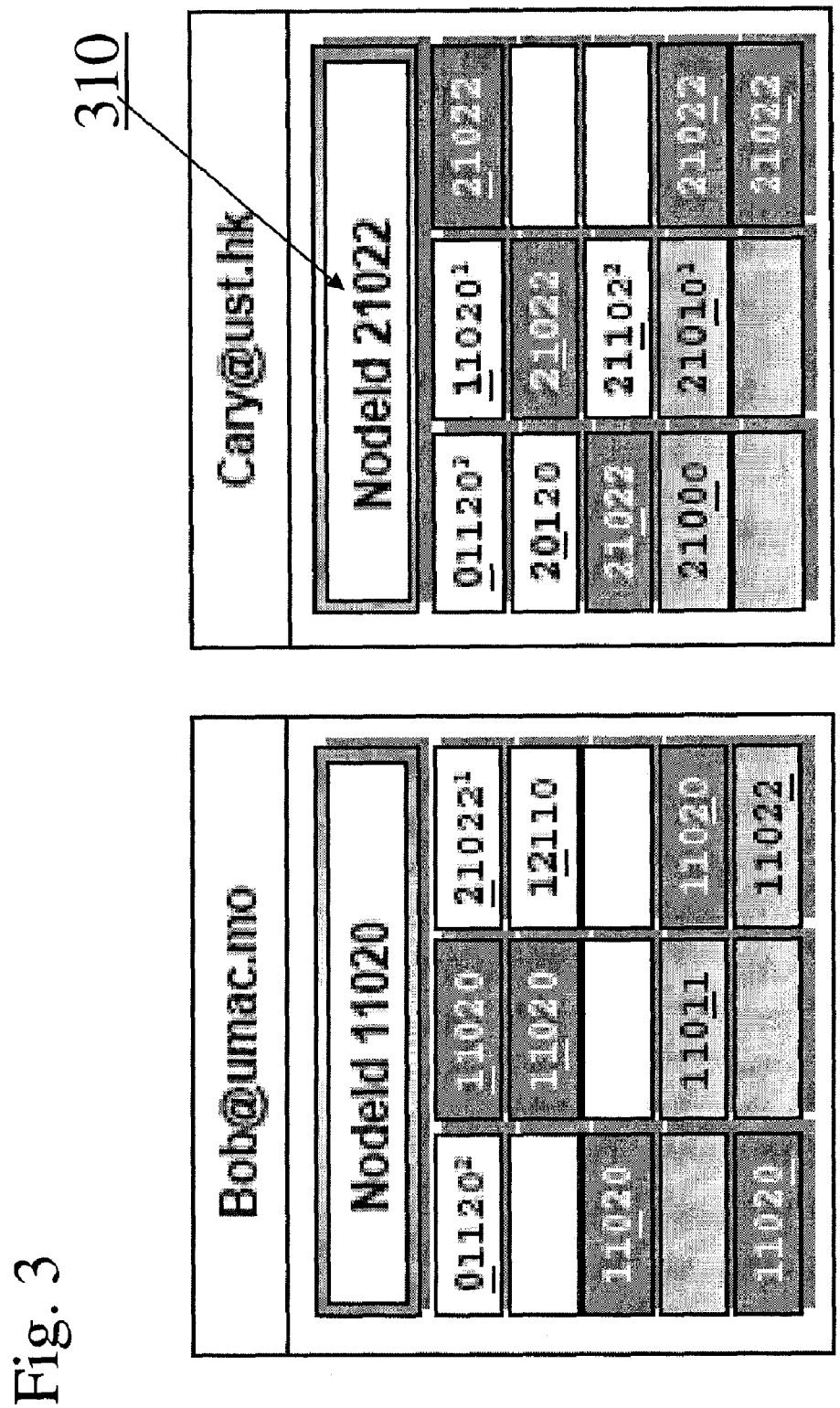
FIG. 3 shows an example of routing tables of Alice's buddies in her hot list.

As an example. FIG. 3 shows the routing tables of Alice's first-hop buddies, Bob and Cary. Note that Alice and Cary are of the same domain, so their keys share the same prefix 210 310. FIG. 4 shows the routing table of Alice after Step 1 of table exchange, and FIG. 5 shows Alice's final routing table after acquiring and replacing entries with Alice's first-hop buddies' routing table entries. Note that the table exchange procedure also fills Alice's routing table with more entries. When a query is routed to a node, the node first checks if this is a lookup message for itself. If so, the node processes the query accordingly. If not, the node checks the target against its hot list. Failure to find the target in the hot list leads to normal routing procedure of Pastry: the node checks if the target can be found in leaf set followed by entries in the routing table. This reduces access time to one's first-hop buddies to one search hop, and ensures that accesses to other nodes are not worse than Pastry.

C. Simulation and Results

Simulations are performed to compare the performance of the proposed scheme with that of Pastry. The performance metric is the average hop counts, which is defined by the average number of routing hops for a search to reach its destination. The enhancements made by clustering the nodes, and the improvements contributed by exchanging routing tables with buddies are studied.

Simulation Setup

Simulations are run on the simulator, J-Sim, and a network topology is generated by GT-ITM with 1024 routers. Various numbers of nodes are attached to the routers randomly. The relations among nodes should be comparable to social relations among people. In the sample embodiment, a multi-component static model is used to simulate the social relation.

1) Generation of Hot List

Assuming there are q groups and N people in the social network. m and f are two other system parameters determining how a person make acquaintances with others: m is related to the number, whereas f is related to the pattern.

The model is constructed as follows. Initially, there are N people in the society. Each person i is represented as a vertex and is assigned a q-component weight $(w_{i(1)}, w_i^{(2)}, \ldots, w_i^{(q)})$. The weight represents the ranking of that person in that group. Edges are connected between two vertices if the two people know each other. First, choose a group μ among the q groups. Then, two vertices (i, j) are chosen with probabilities equal to normalized weights, $p_i \equiv w_i^{\mu}/\Sigma_k w_k^{(\mu)}$ and $p_j \equiv w_j^{\mu}/\Sigma_k w_k^{(\mu)}$. Edges are attached to the two vertices unless they are already connected in the same group. The process is repeated until (1−f)mN edges are added to the system. To mimic social relations, people should know people from other groups. This social relationship is formed following the maximum weights among the q components each individual has. The normalized maximum weight of vertex i is defined as $w_i = \max(p_i^{(1)}, p_i^{(2)}, \ldots, p_i^{(q)})$. Then two distinct vertices i and j are chosen with probabilities, $w_i/\Sigma_k w_k$ and $w_j/\Sigma_k w_k$, respectively. The process is continued until fmN edges are formed. In the sample simulation, m is set to 3 so that on average each person knows 5 others. f is chosen to be 0.2, which is shown to be optimal in other study.

2) Generation a NodeID

The nodeID for each node is generated with parameters b set to 2, l set to 10 (prefix bit number p to be 6 and the suffix bit number $I_s$ to be 4), and L set to 4. These parameters affect the size of routing tables and leaf sets. With these parameters set to a smaller value, the overhead size decreases. However, as Pastry route a message in $\lceil \log_{2^b} N \rceil$ steps, a small value of b may increase the hop counts. The proposed scheme augments a node with hot list, and therefore, can compensate the increase while keeping the overhead small.

3) Generation of Search Queries

Assuming the call pattern of a person follows Zipf distribution. For each person, a call rank list is generated that contains all others in the system. The person's direct buddies rank the highest in the list, second hop buddies the next, and so on. Each individual searches another person with probability $p \sim 1/i^a$, where is the ranking and a is set to 1.4, unless state otherwise.

Results

Figure 6:
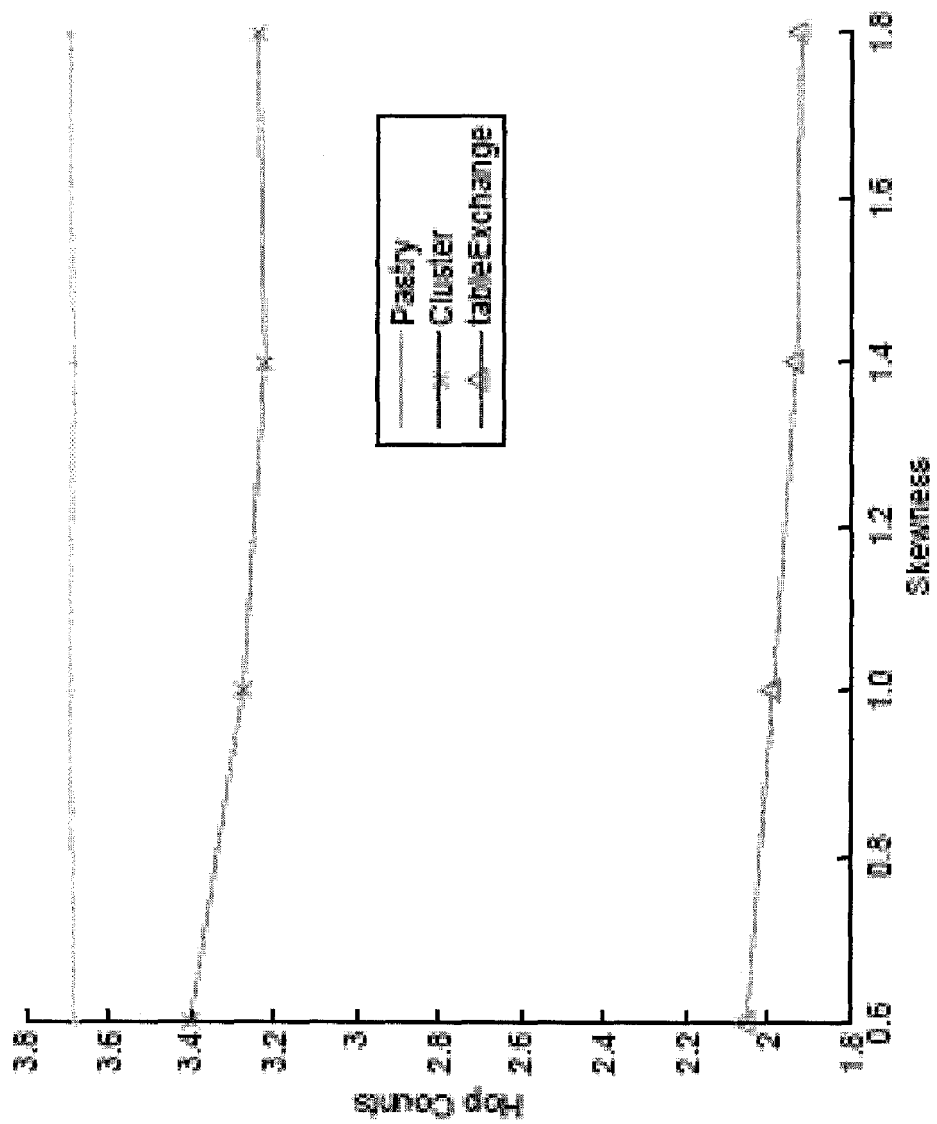
FIG. 6 shows simulation results of average hop counts against skewness (a).

First how the skewness of search queries related to the average hop counts is studied. A network with N=1024, q=4 is chosen as the baseline. In FIG. 6, the average hop counts generally drops with increasing skewness. Pastry is insensitive to the skewness, which is expected, since it does not consider search pattern. Clustering the user gives improvement to the original Pastry, leading to the average hop counts dropping with increasing skewness. The improvement is contributed by both the use of hot lists and the shortcuts to various groups. Further enhancement is made by exchanging routing tables with buddies. In the simulation, different numbers for the table exchange are tested, and 100 is found to give a steady system. For each exchange, a node randomly chooses a buddy from its hot list, requests its routing table and replaces entries. After the process of exchange, a node's routing: table is now populated with entries of high access rate.

Figure 7:
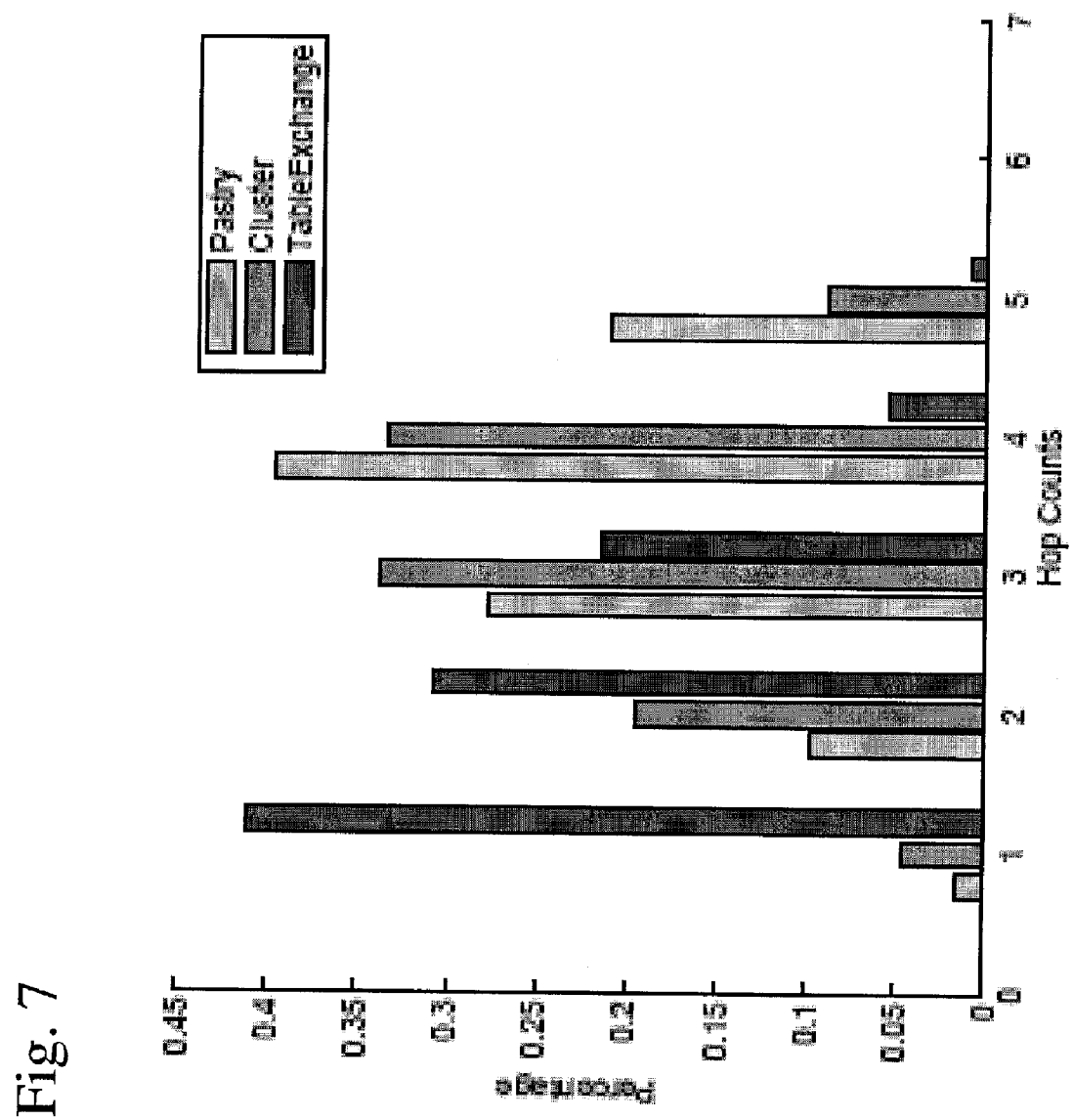
FIG. 7 shows simulation results of hop distribution of Pastry, Cluster and Table Exchange with N=1024, q=4, h=5 and a=1.4.

FIG. 7 shows the hop distribution of the three schemes: Pastry, Cluster and Table Exchange. It shows that most of the searches in Pastry are completed in several hops, (mostly four), whereas most of the searches in Table Exchange are done in one hop with over 40%). Hot lists allow searches for the most frequently accessed people to be completed in one hop, and this contributes to the increase of percentage of one hop of Cluster compared to Pastry. Table Exchange puts peers of short social hops in the routing table so the percentage of one hop increases much.

Figure 8:
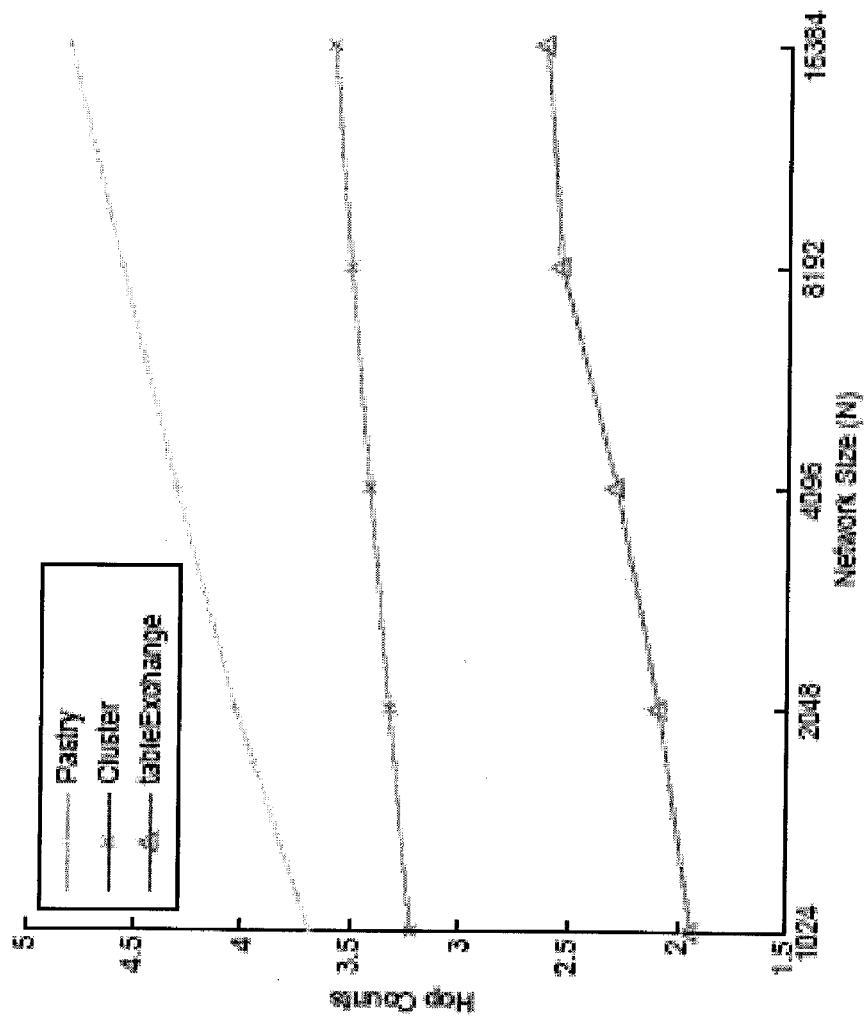
FIG. 8 shows simulation results of average hop counts against network size.

How the proposed scheme is related to large network size is also studied in the simulation. FIG. 8 shows that clustering is not affected much by increase in network size. This is because the number of groups increases with the network size, and the improvement made by shortcuts to various groups increases as well. Improvements made by exchanging routing tables decreases with larger network size. This is due to the fact that the size of routing table remains the same for all network size, and the entries a routing table can hold remain the same.

D. Implementations

PRIM is a project demonstrating applications containing some embodiments described in this application. Among many features that can be supported by this invention. PRIM offers application examples in data communications, Network Address Translations (NAT), Voice over IP communications.

Figure 9:
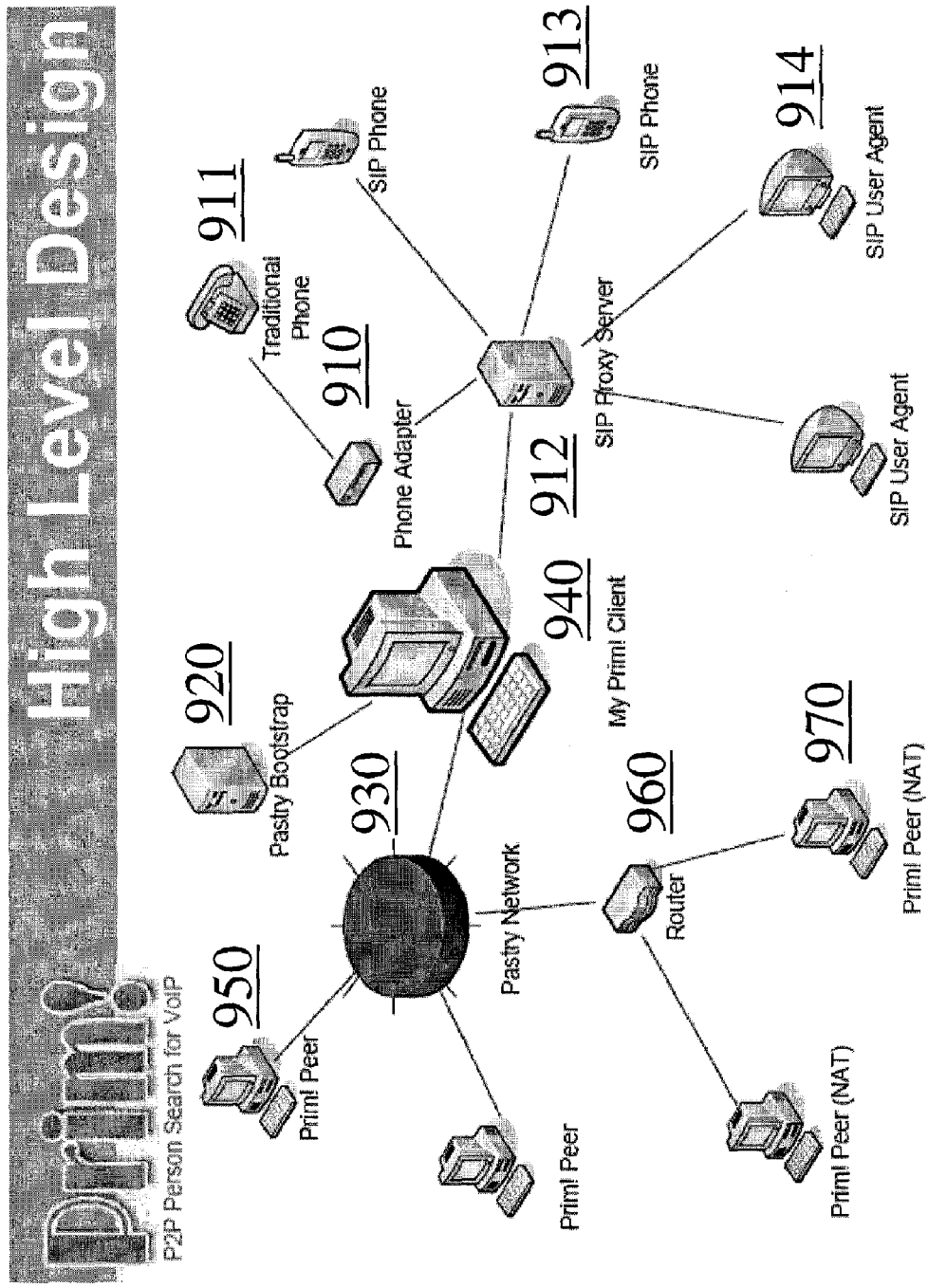
FIG. 9 illustrates a high level architecture design of PRIM.

FIG. 9 illustrates a high level architecture design of PRIM. 910 is a phone adaptor that would allow a traditional PSTN phone 911 to participate in VoIP networks with SIP capability. 913 is a phone with SIP capability, and 914 is a computer with SIP User Agent installed. 920 is a Pastry Bootstrap discussed above. 930 is a network with Pastry capability. 940 is a computer with PRIM client software. 950 is a peer in PRIM and 970 is a peer with NAT capability that is connected with a IP router 960.

Figure 10:
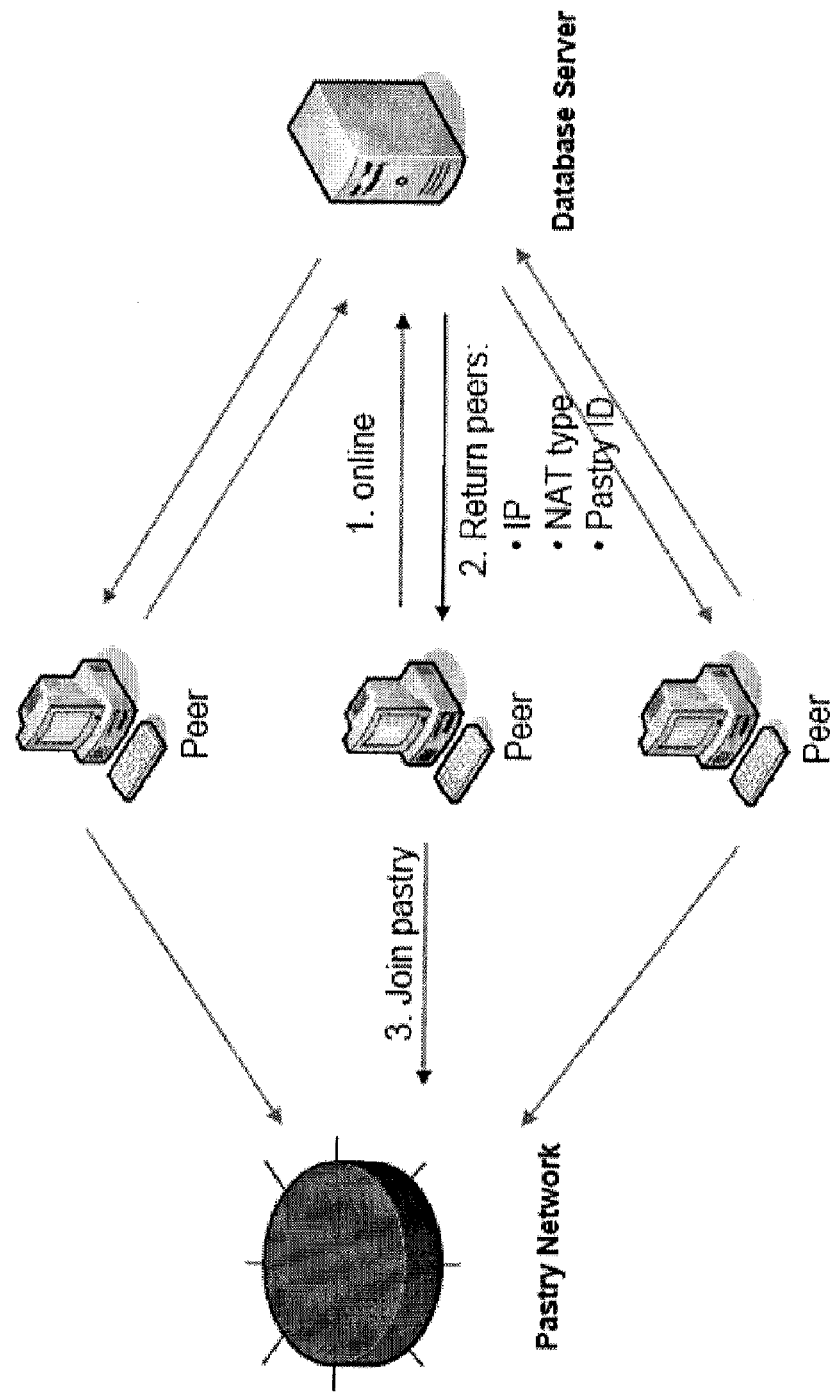
FIG. 10 shows bow a new peer in PRIM joins the network.

FIG. 10 shows how a new peer in PRIM joins the network. In this implementation, the new peer sends request to a Bootstrap server, who returns information, about neighboring peers of this new peer. The returned information contains at least: IP address of those peers, NAT type supported and their corresponding Pastry Ids.

Figure 11:
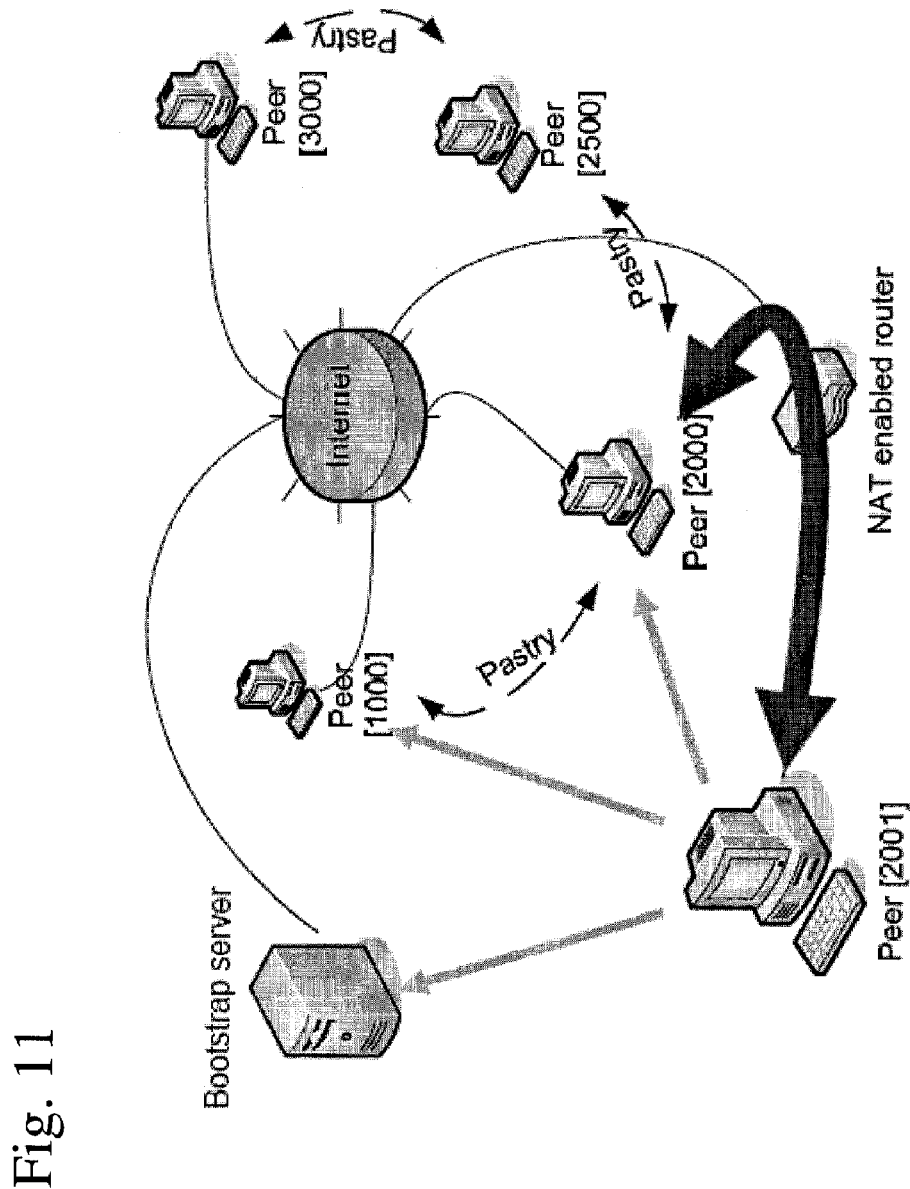
FIG. 11 shows how a new peer with NAT capability in PRIM joins the network.

FIG. 11 shows how a new peer with NAT capability in PRIM joins the network.

Figure 12:
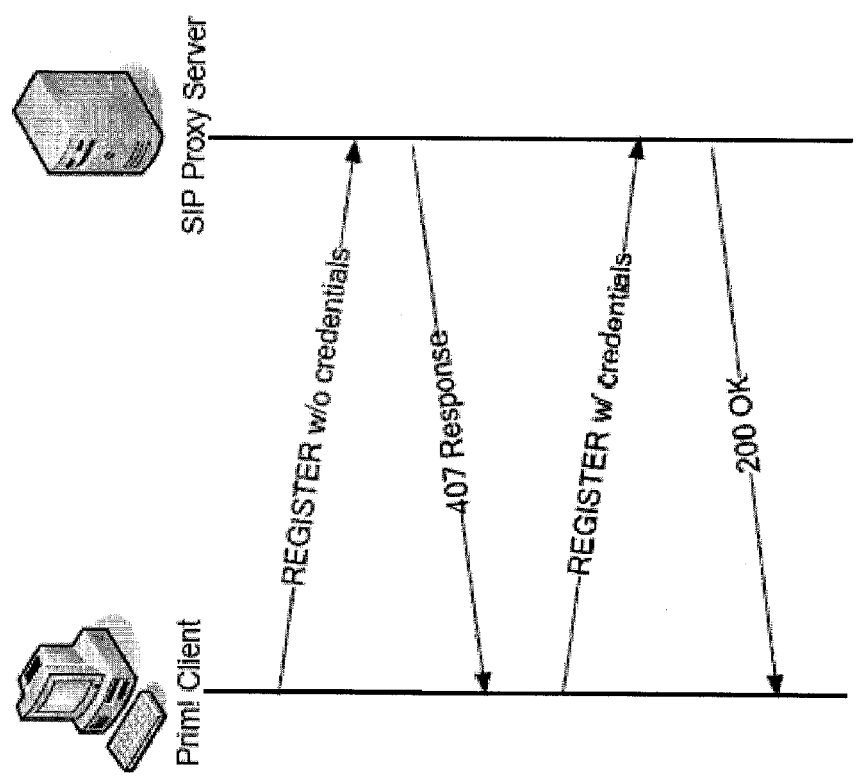
FIG. 12 shows how a PRIM client registers with a Voice over IP network.

FIG. 12 shows bow a PRIM client registers with a Voice over IP network.

FIG. 12 shows how a PRIM client registers with a Voice over IP network.

Figure 13:
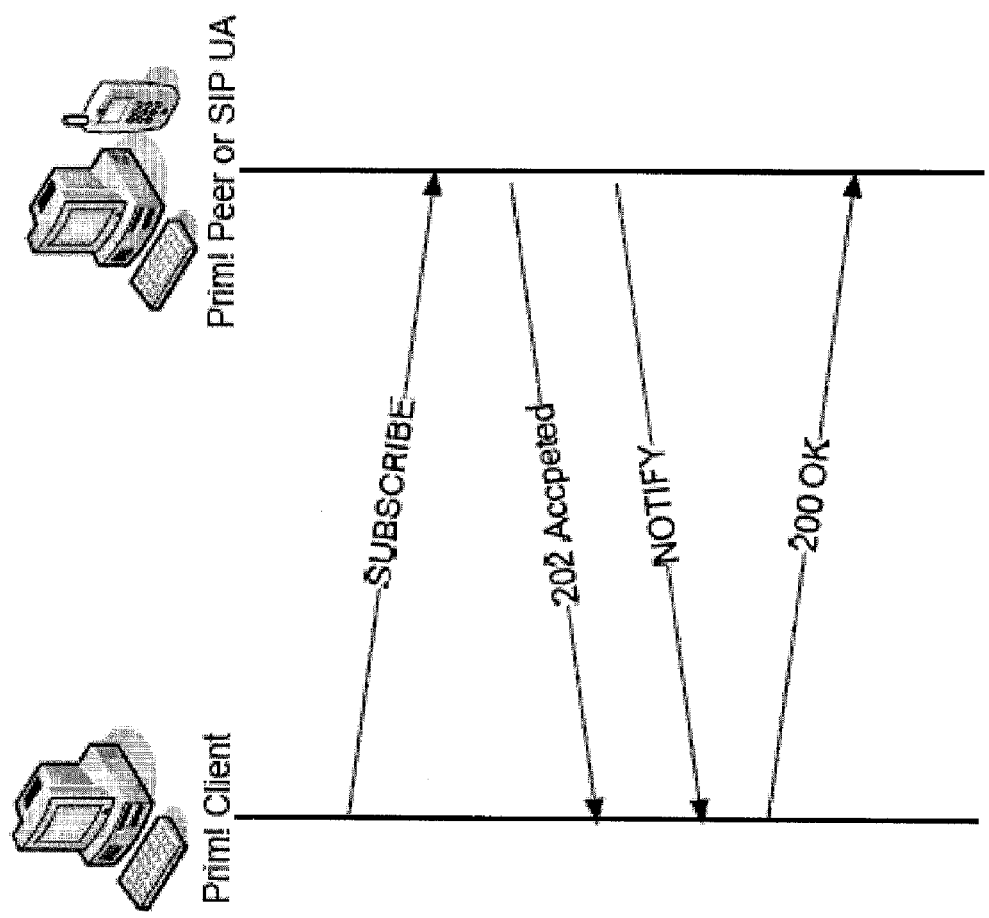
FIG. 13 shows how a PRIM client subscribes SIP service with a SIP phone or a computer with SIP UA.
Figure 14:
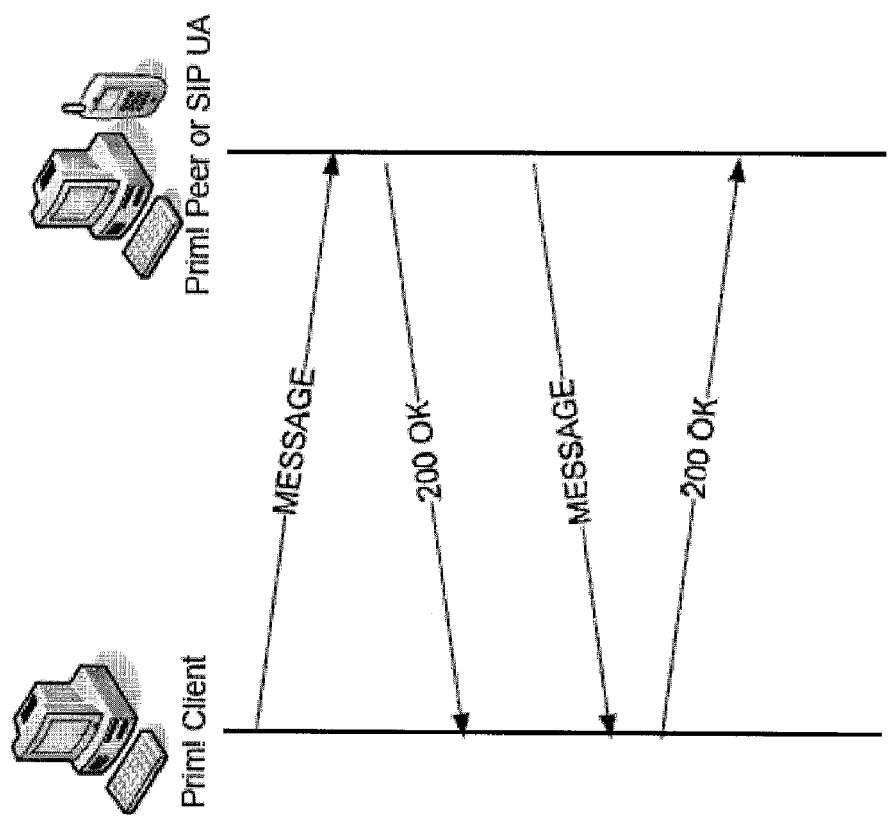
FIG. 14 shows how a PRIM client sends a message to a SIP phone or a computer with SIP UA.

FIG. 13 shows how a PRIM client subscribes SIP service with a SIP phone or a computer with SIP UA, FIG. 14 shows how a PRIM client: sends a message to a SIP phone or a computer with SIP UA.

Figure 15:
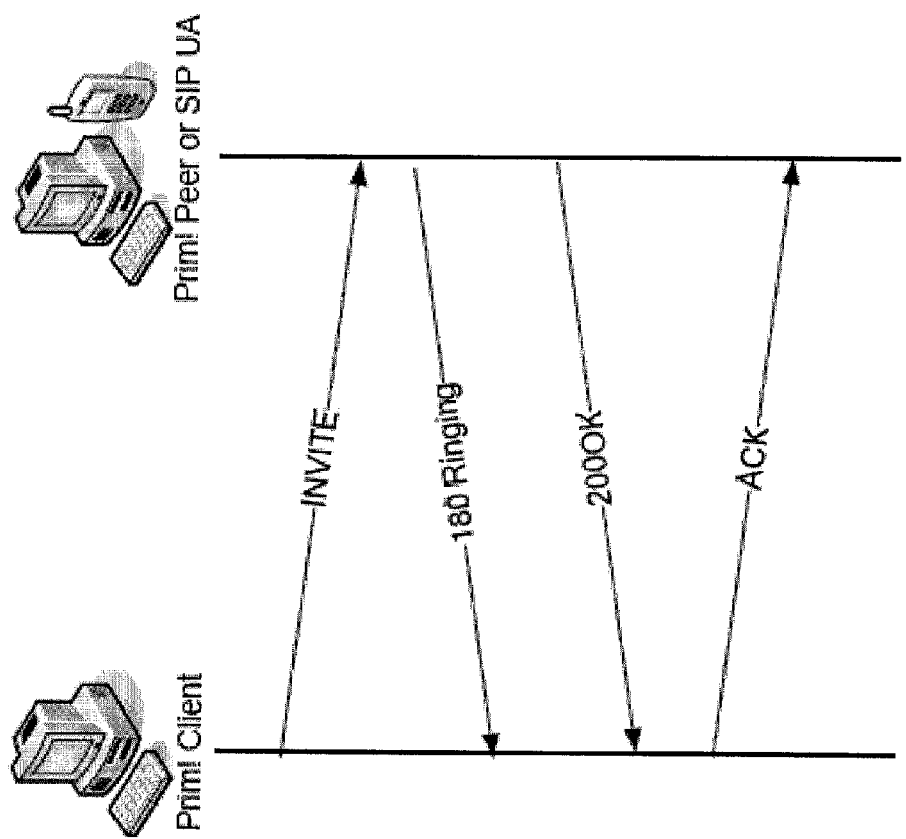
FIG. 15 shows how a PRIM client invites a MP phone or a computer with SIP UA to establish a voice connection.

FIG. 15 shows how a PRIM client invites a SIP phone or a computer with SIP UA to establish a voice connection.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given.

For example, instead of using routing tables from hot list's buddies to update a node's routing table, the buddies of the hot lists from hot list's buddies can be used.

For another example, the sample embodiment uses Pastry to build an initial routing table, other methods that uses prefix matching of node or key Id in routing can also be used to build the initial routing table. For example, Gnutella or Chord can be used instead of Pastry.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as tiled are intended to be as comprehensive as possible, and NO subject matter is intentionally relinquished, dedicated, or abandoned.

What is claimed is:

1. A network architecture for person-to-person communication, the network architecture comprising:
a structured-overlay architecture that includes node identifier assignments for persons in a network wherein the node identifier assignments have a structure that includes locality information;
a peer-to-peer device of a plurality of peer-to-peer devices coupled to each other via the network and including local routing tables configured to provide routing for individual persons to make contact with other persons according to the node identifier assignments; and
automatic procedures configured to modify the routing tables, for a respective person, to provide routing data for other persons most frequently accessed by that respective person,
wherein the node identifier assignments are ring-structured, and include hashed domain information and hashed information of an individual person, and wherein the hashed domain information is configured to occupy more significant bit positions than the hashed information of the individual person.

2. The network architecture of claim 1, wherein the structured-overlay architecture is implemented by Pastry.

3. The network architecture of claim 1, wherein the automatic procedures are local to the peer-to-peer device.

4. The network architecture of claim 1, wherein the automatic procedures are local to the peer-to-peer device and are configured to be launched automatically if another peer-to-peer device rejoins the network.

5. A method of searching for a person within a peer-to-peer access network, the method comprising:
using by a machine, a structured-overlay architecture to obtain an initial routing table;
updating by the machine, the routing table with first routing entries from at least some individual persons contained in a hot list, wherein the individual persons contained in the hot list correspond to frequently accessed people; and updating further by the machine, the routing table to include second routing entries from at least some respective contacts of the people contained in the hot list;

wherein said using a structured-overlay architecture comprises using node identifier assignments that include hashed domain information and hashed information of an individual person, and wherein the hashed domain information occupies more significant bit positions than the hashed information of the individual person.

6. The method of claim 5, wherein the structured-overlay architecture is implemented by Pastry.

7. The method of claim 5, wherein social hop count information is retained if updating the routing table.

8. A method for a first node associated with a mobile device to search for another node within a peer-to-peer access network, the method comprising:

discovering, by the mobile device, one or more nodes within the peer-to-peer access network;

generating, by the mobile device, a routing table of the first node in accordance with routing tables of the one or more discovered nodes;

updating, by the mobile device, the routing table of the first node based at least on node identifiers (IDs) of one or more nodes from a hot list of the first node, wherein the hot list of the first node comprises node identifiers that are associated with mobile devices that are frequently accessed by the mobile device; and updating, by the mobile device, the routing table of the first node based at least on one or more entries in routing tables of the one or more nodes from the hot list;

wherein each node identifier comprises hashed domain information concatenated with hashed information of an individual person and the hashed domain information comprises a prefix in the node identifier, wherein the hashed domain information occupies more significant bit positions in each node identifier than the hashed information of the individual person.

9. The method of claim 8, wherein the mobile device comprises an Internet telephone.

10. The method of claim 8, wherein said generating, by the mobile device, a routing table of the first node is further performed in accordance with a structured-overlay architecture, and wherein the structured-overlay architecture is implemented by Pastry.

11. The method of claim 10, wherein the structured-overlay architecture uses node identifier assignments which include at least some implicit locality correlation.

12. A method for assigning node identifiers in a structured-overlay peer-to-peer network of people, the method comprising:

utilizing by a computing device, communications characteristics of the people to embed locality information into identifiers of the people;

applying by the computing device, a first hash function to a person identifier (ID) to derive a first string of the identifiers; and applying by the computing device, a second hash function to a domain name to derive a second string of the identifiers;

wherein the first string occupies less significant bit positions than does the second string.

13. The method of claim 8, wherein said generating a routing table of the first node in accordance with routing tables of the one or more discovered nodes comprises:

generating, by the mobile device, the routing table of the first node by using routing tables of:

a second node that is geographically close to the first node;

a third node that has a node ID that is numerically closest to the node ID of the first node; and other nodes that are on a path for the first node to receive a message through the second and third nodes.

14. An article of manufacture including a non-transitory computer-readable medium having instructions stored thereon that, if executed by a computing device, cause the computing device to perform operations comprising:

generating a routing table of a first node;

updating the routing table of the first node based at least on node identifiers (IDs) of one or more nodes from a hot list of the first node, wherein the hot list comprises node identifiers that are frequently accessed by the first node; and updating the routing table of the first node based at least on one or more entries in routing tables of the one or more nodes from the hot list;

wherein each node identifier comprises hashed domain information concatenated with hashed information of an individual person and the hashed domain information comprises a prefix in the node identifier, wherein the hashed domain information occupies more significant bit positions in each node identifier than the hashed information of the individual person.

15. The article of manufacture of claim 14, wherein said generating a routing table of the first node comprises:

generating the routing table of the first node by using routing tables of a second node that is geographically close to the first node, a third node that has a node ID that is closest to the node ID of the first node, and other nodes that are on a path for the first node to receive a message through the second and third nodes.

16. An apparatus, comprising:

a machine configured to perform searches within a peer-to-peer network, the machine further being configured to generate a routing table, update the routing table with first routing information from one or more nodes in the peer-to-peer network that are frequently accessed by the machine, and update the routing table with second routing information from at least some respective contacts of the one or more nodes;

wherein:

each node in the peer-to-peer network is assigned a numerical node identifier (ID);

the node ID of each respective node comprises a hashed user name of the respective node and a hashed domain name of the respective node;

the hashed domain information comprises a prefix in the node ID; and the hashed user name is configured to occupy less significant bit positions in the node ID than the hashed domain name.

17. The apparatus of claim 16, wherein the machine comprises a mobile device.

18. The apparatus of claim 16, wherein the machine comprises an Internet telephone.

19. The apparatus of claim 16, wherein to generate the routing table, the machine is configured to use routing tables of another node that is geographically close to the machine, a still another node that has a node ID that is closest to a node ID of the machine, and still other nodes that are on a path for the machine to receive a message through the another and still another nodes.

20. The method of claim 8, wherein the hashed information of the individual person in each of the node identifiers of the one or more nodes comprises hashed information of a username uniquely associated with an owner of a hot list of the one or more nodes.

\* \* \* \* \*